March 20, 1956  E. F. REYNOLDS  2,738,718
HEATING, VENTILATING AND WINDSHIELD DEFROSTING SYSTEM
Filed Jan. 2, 1952  3 Sheets-Sheet 1

Inventor
Edward F. Reynolds
By Willits, Helmig & Baillio
Attorneys

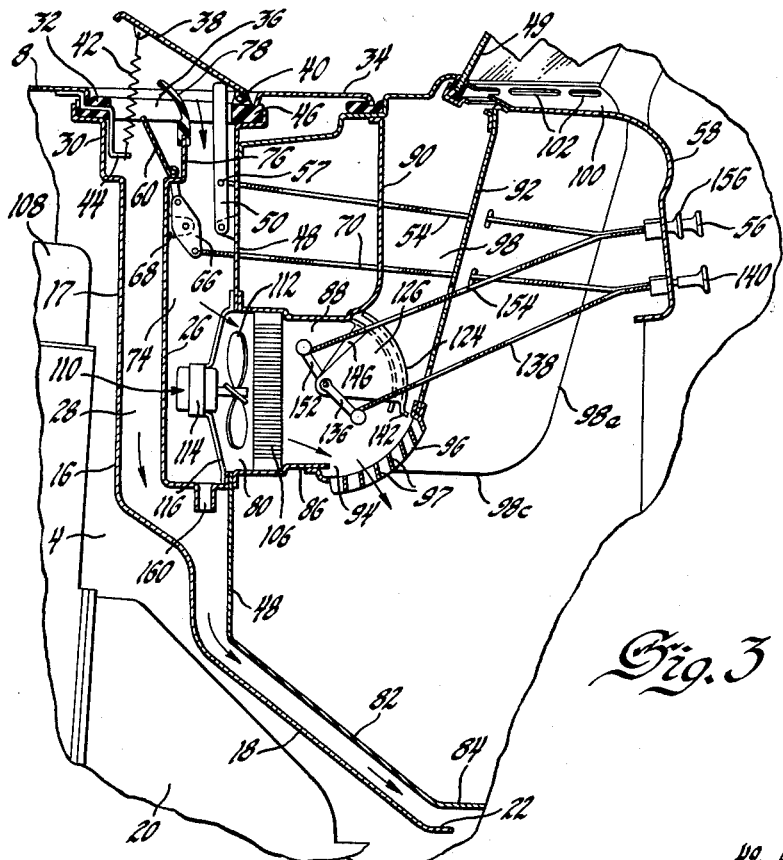

March 20, 1956     E. F. REYNOLDS     2,738,718
HEATING, VENTILATING AND WINDSHIELD DEFROSTING SYSTEM
Filed Jan. 2, 1952     3 Sheets-Sheet 3

Inventor
Edward F. Reynolds
By Willits, Helwig & Baillio
Attorneys

United States Patent Office 2,738,718
Patented Mar. 20, 1956

2,738,718

HEATING, VENTILATING, AND WINDSHIELD DEFROSTING SYSTEM

Edward F. Reynolds, Fenton, Mich., assignor to General Motors Corporation, Detroit, Mich., a corporation of Delaware Application January 2, 1952, Serial No. 264,577

13 Claims. (Cl. 98—2)

This invention relates to heating, ventilating, and defrosting systems and more particularly to heating, ventilating and defrosting systems employed on motor vehicles.

Many of the heating, ventilating and defrosting systems of the type which heat and circulate fresh air therethrough have associated therewith air inlet ducts which extend beneath the hood of the vehicle. Air is usually drawn into such ducts at points disposed intermediate the top and bottom of the radiator and as a result exhaust fumes from other vehicles as well as other gases and odors often are drawn into the system and discharged into the passenger compartment.

One object of the present invention is to provide a heating, ventilating, and windshield defrosting system wherein fresh air is drawn through an opening in the cowl of the vehicle and then passed through a heating system before being discharged into the passenger compartment of the said vehicle thus minimizing or preventing undesirable exhaust fumes from being drawn into the system with the air.

Another object is to provide in a system of the stated character a novel and highly useful arrangement of valves whereby the air may be directed either directly into the passenger compartment of the vehicle or upwardly along the inside of the windshield to defog or defrost the latter.

A further object is to provide an air passage between the engine compartment and the passenger compartment through which fresh air may circulate, thereby insulating the passenger compartment from said engine compartment.

A further object is to provide valve means for controlling circulation of air through the insulating passage and also through the heating and ventilating passages.

A further object is to provide in systems of the stated character readily accessible control means whereby the flow of air through the insulating passage as well as the passages through which air is directed into the passenger compartment or upwardly along the windshield may be effectively controlled.

A still further object is to provide a heating, ventilating and windshield defrosting system which is simple in construction, economical in manufacture and durable and efficient in operation.

Other and further objects will become apparent as the description of the invention progresses.

Of the drawings:

Fig. 3 is a side elevational view, partly in section, showing the arrangement of the control valves when all of the air circulating through the system is utilized for direct heating purposes.

Fig. 4 is a view similar to Fig. 3 showing the position of the control valves when all of the air circulating through the system is employed for defogging or defrosting the windshield.

Figure 1:
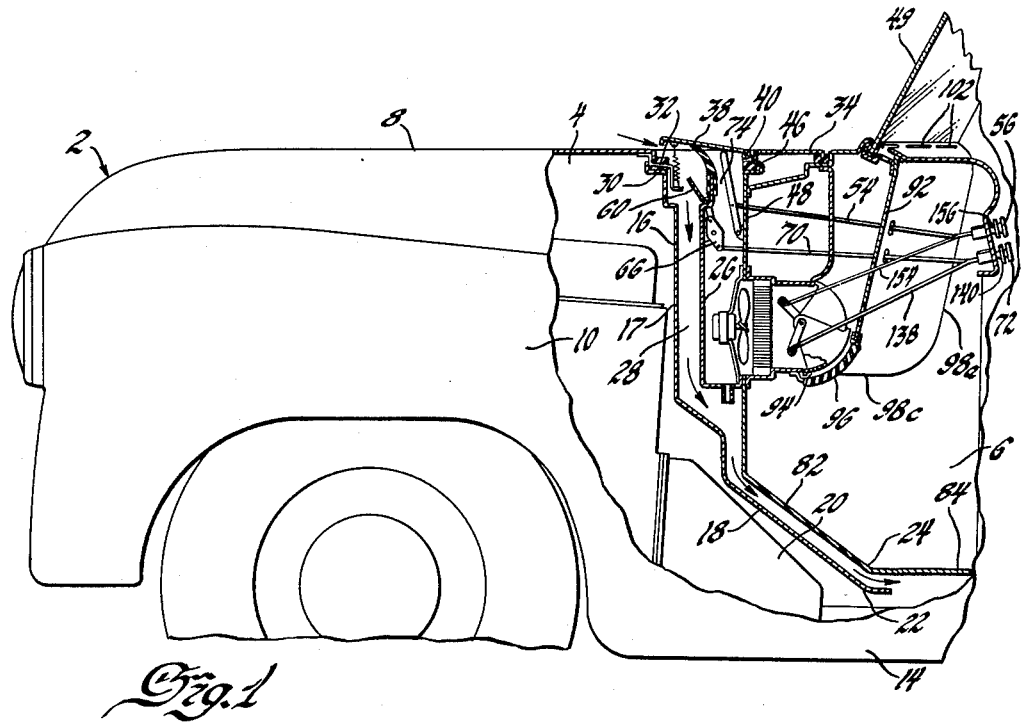
Fig. 1 is a side elevational view, partly in section, of the front portion of a motor vehicle certain parts being broken away to more clearly illustrate the structure of the associated heating, ventilating, and windshield defrosting apparatus.

Referring to the drawings the numeral 2 designates generally a motor vehicle having the usual engine compartment 4 and the passenger compartment 6. The engine compartment 4 is enclosed by the usual hood 8 which extends transversely to the inner edges of the fenders 10 at either side of the vehicle in the usual manner. Secured in any suitable manner to the body structure 14 proper and extending transversely of engine compartment 4 is an irregular shaped wall 16. The upper portion 17 of wall 16 is substantially vertical while lower portion 18 thereof is of irregular shape so as to clear the transmission 20. Lower portion 18 of wall 16 terminates in a downwardly and rearwardly extending portion 22 which lies beneath the floor 24 of passenger compartment 6. Spaced rearwardly of wall 16 is a second transversely extending wall 26 which forms with wall 16 a passage 28 through which air may circulate as shown by the arrows in Figs. 1 and 3. The upper end of wall 16 is bent forwardly and upwardly as shown at 30 to provide a seat for a resilient seal 32. Extending rearwardly of hood 8 is the usual cowl indicated generally at 34 which in the present instance has an opening 36 provided therein through which air may enter the upper end of passage 28. A closure 38 pivoted at 40 is adapted to close opening 36. Closure 38 is normally urged to closed position by a spring 42, said spring connecting the front end of said closure to a bracket 44 secured to and extending rearwardly of insulator 32. To prevent leakage around the rearwardly disposed end of closure 38 a resilient seal 46 is provided. Seal 46 is mounted on the upper end of a wall 48 spaced rearwardly of wall 26 and extending transversely of the passenger compartment 6. A windshield 49 of any suitable construction is secured to and extends upwardly from the rearmost end of cowl 34.

Figure 2:
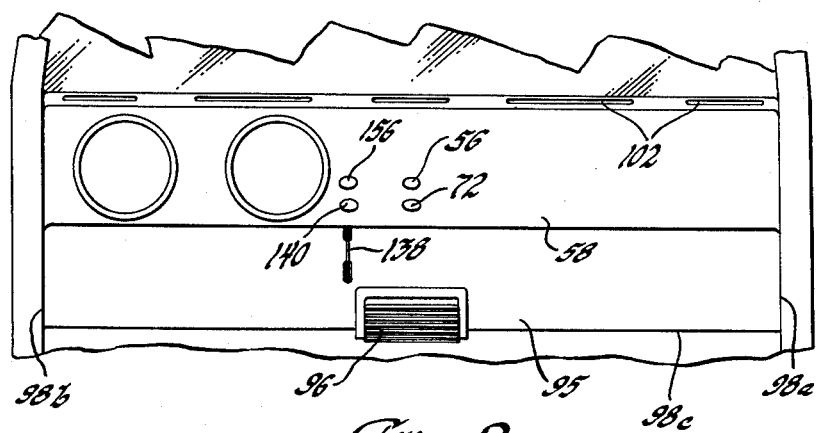
Fig. 2 is a fragmentary elevational view looking toward the front of the vehicle from inside of the passenger compartment thereof showing the instrument panel and the discharge register and passages for the heating, ventilating and defrosting system shown in Fig. 1.

Closure 38 is actuated to open position by a cam lever 50 pivoted at its lower end to a bracket 52 secured to wall 48. A Bowden cable 54 is secured at one end as shown at 57 to lever 50, and at the other end to an operating knob 56 mounted in any suitable manner on the instrument panel 58 of the vehicle. It is seen that by pulling on knob 56 lever 50 will swing in a clockwise direction thereby camming closure 38 upwardly against the tension of spring 42. When knob 56 is pushed inwardly lever 50 is moved in a counterclockwise direction thereby permitting spring 42 to actuate closure 38 to closed position. The upper end of passage 28 may be closed by means of a door 60 pivoted at 62 to wall 26. An arm 64 secured to and extending rearwardly of door 60 has pivotally connected to the outer end thereof the upper end of a lever 66. Lever 66 is pivoted intermediate its ends on a bracket 68 provided on wall 26 and the lower end thereof has secured thereto one end of a Bowden cable 70. The other end of Bowden cable 70 is connected to a knob 72 mounted in any suitable manner on instrument panel 58 and disposed directly beneath knob 56, as shown in Fig. 2. It is apparent that to open door 60, knob 72 is pulled outwardly and conversely to close said door the knob is pushed inwardly toward instrument panel 58.

Walls 26 and 48 define a passage 74 through which fresh air may enter the system for heating, ventilating and windshield defrosting purposes. An extension 76 is provided at the upper end of wall 26 to which is secured a vertically extending flexible resilient seal 78. Seal 78 extends transversely of the vehicle and is adapted to engage the undersurface of closure 38 when the latter is either in partially closed position as shown in Fig. 1, or in its fully closed position. When in partially closed position, air is permitted to flow through insulating passage 28 only since the seal 78 prevents air flow to the inlet passage 74. When the closure 38 is moved toward fully open position it clears seal 78 and, consequently, air may flow through both of the passages 28 and 74. If it is desired that no air should pass through passage 28, the door 60 may be closed.

Wall 48 has provided intermediate the ends thereof an opening 80 through which air flowing through passage 74 may discharge. The lower end of wall 48 may be bent downwardly and rearwardly, as shown at 82, and then rearwardly as shown at 84 to form the floor 24 of the passenger compartment 6. Portions 82 and 84 are spaced from lower portions 18 and 22 of wall 16 and form a continuation of passage 28 which directs the air flowing therethrough beneath the vehicle. Wall 48 has secured thereto in alignment with opening 80 a substantially rectangular tubular member 86 which provides a rearwardly extending passage 88 communicating with passage 74. Tubular member 86 has secured to the upper end thereof, in any suitable manner, a transverse wall 90. Spaced rearwardly of wall 90 is a second transversely extending wall 92. Wall 92 may also be secured to the lower end of tubular member 86 in any suitable manner and has an opening 94 provided at the lower curved end 95 thereof. A register 96 is secured to wall 92 and to tubular member 86, in any suitable manner, and has a series of transverse vanes 97 provided therein for directing the air flowing through passage 88 downwardly toward the floor 24 of the vehicle. The spaced walls 90 and 92 provide an upwardly extending passage 98 through which air may flow toward windshield 49. The upper end of passage 98 on the passenger side of windshield 49 is closed by a panel 100 having a series of transversely spaced, elongated slots 102 provided therein through which air is directed against the inside of windshield 49. Cowl 34 extends over and closes the upper end of passage 98 disposed forwardly of windshield 49. It is apparent that the air entering passage 74 when closure 38 is open may flow either upwardly through passage 98 and be directed against the inside surface of windshield 49 or may flow through the openings in register 96 directly into the passenger compartment of the vehicle. Passage 98 is closed at the sides by side walls 98ᵃ and 98ᵇ and at the lower end by wall 98ᶜ so that air may escape therefrom only through opening 94 or through the slots 102 in panel 100.

Mounted in any suitable manner within tubular member 86 is a heating core 106. Heating core 106 may be of any well known construction and may consist of a series of finned tubes which are connected in the usual fashion to the coolant circulating system associated with the engine 108 provided in compartment 4. A fan mechanism indicated generally at 110 and consisting of a fan 112 driven by an electric motor 114 is secured by means of a bracket 116 to wall 48. Any suitable control mechanism may be provided for controlling both the flow of fluid through heating core 106 and also for controlling the speed and operation of fan motor 114. For a complete disclosure of such a control mechanism reference may be had to the copending application of Little et al., Serial No. 230,832, filed June 9, 1951.

Figure 5:
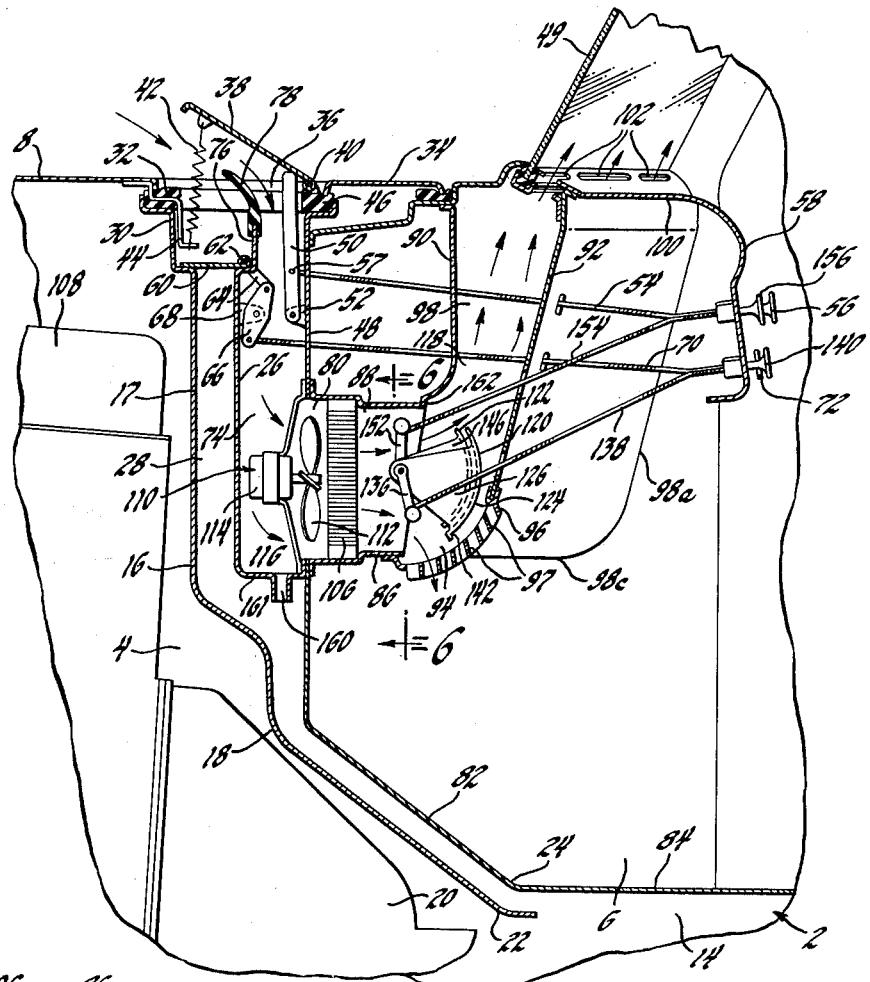
Fig. 5 is a view similar to Figs. 2 and 3 showing the position of the control valves when a portion of the air circulating through the system is utilized for heating purposes and a portion for defogging or defrosting the windshield.
Figure 6:
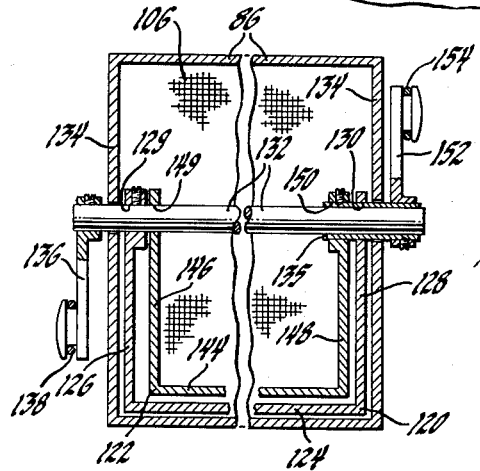
Fig. 6 is a sectional view showing the means for mounting the control valves, said view being taken substantially along line 6—6 of Fig. 5.

The walls 90 and 92 defining passage 98 converge toward the lower ends thereof forming a restricted inlet opening or throat 118. In order to control the flow of air to passage 98 and discharge opening 94, a pair of adjustable dampers or valves 120 and 122 are provided. Valve 120 comprises an arcuate portion having a pair of segmental arm portions 126 and 128 secured to the opposite ends thereof. The forwardly disposed ends of arms 126 and 128 having aligned shaft receiving openings 129 and 130 provided respectively therein for receiving an operating shaft 132. Shaft 132 may be journaled in any suitable bearings provided in the side walls 134, 134 of tubular member 86. Arm 126 is keyed or otherwise rigidly connected to shaft 132 so as to move therewith. The opening 130 in arm 128 is larger than opening 129 and receives a sleeve 135 loosely mounted on shaft 132 near the right-hand end of the latter as shown in Fig. 6. Secured in any suitable manner to shaft 132 is the hub of an operating arm 136 to the outer end of the latter of which is secured one end of a Bowden cable 138. The other end of Bowden cable 138 is secured to a knob 140 mounted in any suitable manner on the instrument panel 58 of the vehicle. It therefore is seen that to move valve 120 from the position shown in Figs. 1 and 4 to the positions shown in Figs. 3 and 5 knob 140 is simply pulled outwardly, and conversely in order to actuate the said valve in the reverse direction the knob is pushed inwardly toward the instrument panel 58. The lower end of arcuate portion 124 is provided with a lip 142 which engages the forward end of member 86 when the valve 120 is in its fully lowered position, as shown in Figs. 1 and 4.

Valve 122 is similarly constructed and also comprises an arcuate outer portion 144 having a pair of segmental arms 146 and 148 connected to the opposite ends thereof. Arms 146 and 148 also have apertures 149 and 150 provided respectively therein for receiving shaft 132 and sleeve 135. Valve 122, it will be noted, particularly upon reference to Figs. 3, 4 and 5, is concentrically arranged with respect to valve 120, the arms 146 and 148 being correspondingly shorter than the arms 126 and 128 of valve 120. The width of the arcuate portion 144 of valve 122 is somewhat less than that of valve 120 so that it may be operated within the confines of the latter. The arm 148 is keyed or otherwise secured to sleeve 135 while arm 146 is loosely mounted on shaft 132. The hub of an operating arm 152 for valve 122 is secured by any suitable means to the sleeve 135. The outer end of operating arm 152 has secured thereto, one end of a Bowden cable 154 the other end of the latter being secured in any suitable manner to a knob 156. Knob 156 is mounted in any suitable manner on instrument panel 58 directly above knob 140. Accordingly, in order to adjust valve 122 in a clockwise direction about shaft 132, knob 156 is pulled outwardly. Fig. 3 shows the extreme position of valve 122 in a counterclockwise direction. To actuate valve 122 in a counterclockwise direction, knob 156 is pushed inwardly toward the instrument panel 58.

In order to permit any moisture which enters passage 74 to drain therefrom, a drain opening 160 is provided in the lower wall 161 thereof. The moisture thus may drain into the lower extremity of passage 28 and be discharged thereby beneath the vehicle.

From the foregoing description it is apparent that by manipulating knobs 140 and 156 the valves 120 and 122 may be moved individually to any desired position of adjustment. In the event that it is desired to shut off substantially all air to opening 94 and also to passage 98, valves 120 and 122 are actuated to the position shown in Fig. 1. When in this position, the upper end 158 of valve 122 engages an abutment 162 provided at the end of tubular member 86 thereby limiting the movement of the said valve in a counterclockwise direction. Should it be desired to direct all of the air through register 96, the valves 120 and 122 are moved to the position shown in Fig. 3. In the event it is desired to direct all of the air upwardly through the passage 98 so as to defrost the windshield 49, valves 120 and 122 are actuated to the position shown in Fig. 4. On the other hand should it be desired to direct a portion of the air to register 96 and another portion of the air to passage 98 for defogging purposes, valves 120 and 122 are moved to the position shown in Fig. 5.

From the foregoing description it is seen that a simplified and highly efficient heating, ventilating and windshield defogging and defrosting mechanism has been provided. Fresh air may be drawn from outside the vehicle and directed through a heating unit and then be aportioned as desired for heating or windshield defogging or defrosting purposes. During the summer months the core 106 may be disconnected from the coolant circulating system of the engine 108 and unheated air may then be directed into the passenger compartment directly through register 96 or upwardly along the windshield through slots 102 provided beneath the windshield. It is also seen that by providing an air passage between the engine compartment 4 and the passenger compartment 6 of the vehicle the latter compartment is insulated from the former compartment which is especially desirable during summer driving.

While but a single embodiment of the invention has been shown and described herein, it is apparent to those skilled in the art that the modifications and changes may be made therein without departing from the spirit of the invention. It therefore is to be understood that it is intended to limit the invention only by the scope of the claims which follow.

What is claimed is:

1. In a motor vehicle having an engine compartment and a passenger compartment, a cowl having an opening therein, spaced substantially transversely extending wall means disposed beneath said opening and forming a through air passage between said compartments for insulating said passenger compartment from said engine compartment, partition means forming with the inner of said wall means a second passage adjacent said first mentioned passage through which air from said opening may flow to said passenger compartment, and a common closure for controlling the flow of air to both of said passages.

2. In a motor vehicle having an engine compartment and a passenger compartment, a cowl having an opening therein, spaced substantially transversely extending wall means disposed beneath said opening and forming a through air passage between said compartments for insulating said passenger compartment from said engine compartment, partition means forming with the inner of said wall means a second passage adjacent said first mentioned passage through which air from said opening may flow to said passenger compartment, a common closure for controlling the flow of air to both of said passages, sealing means for preventing air flow to said second passage when said closure is in partially open position, and additional closure means for controlling the air flow to said first mentioned passage.

3. In a motor vehicle having an engine compartment and a passenger compartment, a cowl disposed between said compartments having an opening therein, a movable closure for said opening, a pair of walls forming an air passage between said compartments, said passage extending from said opening to a point beneath said passenger compartment, a third wall forming a second passage adjacent said first passage through which air from said opening may be supplied to said passenger compartment, said second passage terminating intermediate the ends of said first passage, means providing a drain at one end of said second passage whereby any moisture entering the latter may drain into said first passage and then be directed beneath said vehicle.

4. In a vehicle having a passenger compartment, a cowl having an opening therein, a windshield extending upwardly from said cowl, a pair of walls defining a passage extending downwardly from said opening and terminating exteriorly of the vehicle, a closure, means for operating said closure to cover and uncover said opening, a third wall defining with the inner of said pair of walls a second passage communicating with said opening, duct means communicating with said second passage and forming a third passage inward of said second passage for conducting air from said second passage to said windshield and to said passenger compartment, and valve means located to control the air flow in said third passage.

5. In a vehicle having a passenger compartment, a cowl having an opening therein, a windshield extending upwardly from said cowl, a pair of walls defining a passage extending downwardly from said opening and terminating exteriorly of the vehicle, a closure, means for operating said closure to cover and uncover said opening, a third wall defining with the inner of said pair of walls a second passage communicating with said opening, duct means communicating with said second passage and forming a third passage inward of said second passage for conducting air from said second passage to said windshield and said passenger compartment, valve means located to control the air flow in said third passage, said valve means comprising a pair of valve members adapted for relative movement, said valve members when in one position causing substantially all of the air to flow into said passenger compartment, when in a second position causing substantially all of said air to flow to said windshield and when in other positions causing said air to be apportioned between said windshield and said passenger compartment, and operating means for said valve members.

6. In a vehicle having a passenger compartment, a cowl having an opening therein, a windshield extending upwardly from said cowl, a pair of walls defining a passage extending downwardly from said opening and terminating exteriorly of the vehicle, a closure, means for operating said closure to cover and uncover said opening, a third wall defining with the inner of said pair of walls a second passage communicating with said opening, duct means communicating with said second passage and forming a third passage inward of said second passage for conducting air from said second passage to said windshield and said passenger compartment, valve means located to control the air flow to said windshield and said passenger compartment, means disposed to heat the air entering said third passage, and fan means for inducing the flow of air into said third passage.

7. In a vehicle having a passenger compartment, a cowl having an opening therein, a windshield extending upwardly from said cowl, a pair of walls defining a passage extending downwardly from said opening and terminating exteriorly of the vehicle, a closure, means for operating said closure to cover and uncover said opening, a third wall defining with the inner of said pair of walls a second passage communicating with said opening, duct means communicating with said second passage and forming a third passage inward of said second passage for conducting air from said second passage to said windshield and said passenger compartment, valve means located to control the air flow to said windshield and said passenger compartment, said valve means comprising a pair of valve members adapted for relative movement, said valve members when in one position causing substantially all of the air to flow into said passenger compartment, when in a second position causing substantially all of said air to flow to said windshield and when in other positions causing said air to be apportioned between said windshield and said passenger compartment, operating means for said valve elements, means disposed to heat the air entering said third passage, and fan means for inducing the flow of air into said third passage.

8. In a motor vehicle having an engine compartment and a passenger compartment, a cowl having an opening therein, a pair of walls forming an air passage between said compartments and extending downwardly from said opening for insulating said passenger compartment from said engine compartment, a third wall forming with the inner of said pair of walls a second passage beneath said opening adjacent said first mentioned passage through which air may flow to said passenger compartment, a common closure for controlling the flow of air to both of said passages, sealing means associated with the inner of said pair of walls for preventing air flow to said second passage when said closure is in partially open position, additional closure means for controlling the air flow to said first mentioned passage, operating means for said common closure operable from within said passenger compartment, and operating means for said additional closure.

9. In a motor vehicle having an engine compartment and a passenger compartment, a cowl having an opening therein, a pair of walls forming an air passage between said compartments and extending downwardly from said opening for insulating said passenger compartment from said engine compartment, a third wall forming with the inner of said pair of walls a second passage beneath said opening adjacent said first mentioned passage through which air may flow to said passenger compartment, a common closure for controlling the flow of air to both of said passages, sealing means associated with the inner of said pair of walls for preventing air flow to said second passage when said closure is in partially open position, additional closure means for controlling the air flow to said first mentioned passage, operating means for said common closure operable from within said passenger compartment, operating means for said additional closure, means forming a third passage inward of said second passage communicating therewith, means forming a discharge opening through which air from said third passage may discharge directly into said passenger compartment, a cowl, a windshield extending upwardly from said cowl, means forming a fourth passage communicating with said third passage for conducting air to said windshield for defrosting the latter, and a valve mechanism for controlling the flow of air to said discharge opening and said fourth passage.

10. In a motor vehicle having an engine compartment and a passenger compartment, a cowl having an opening therein, spaced wall means forming an air passage between said compartments and extending downwardly from said opening for insulating said passenger compartment from said engine compartment, a third wall forming a second passage beneath said opening adjacent said first mentioned passage through which air may flow to said passenger compartment, a common closure for controlling the flow of air to both of said passages, sealing means associated with the inner of the walls defining said first passage for preventing air flow to said second passage when said closure is in partially open position, additional closure means for controlling the air flow to said first mentioned passage, operating means for said common closure operable from within said passenger compartment, operating means for said additional closure, means forming a third passage inward of said second passage communicating therewith, means forming a discharge opening through which air from said third passage may discharge directly into said passenger compartment, a cowl, a windshield extending upwardly from said cowl, means forming a fourth passage terminating along the lower margin of said windshield and communicating with said third passage for conducting air to said windshield for defrosting the latter, a valve mechanism for controlling the flow of air to said discharge opening and said fourth passage, said valve mechanism comprising a pair of valve elements, one for controlling the air flow to said discharge opening and the other for controlling the air flow to said fourth passage, and operating means disposed within said passenger compartment for individually operating said valve elements.

11. In a vehicle having a passenger compartment, a cowl having an opening therein, a windshield extending upwardly from said cowl, a pair of walls defining a passage extending downwardly from said opening and terminating exteriorly of the vehicle, a closure, means for operating said closure to cover and uncover said opening, a third wall defining with the inner of said first mentioned walls a second passage communicating with said opening, duct means communicating with said second passage and forming a third passage inward of said second passage for conducting air from said second passage to said windshield for defrosting the latter, said third passage having a restricted throat, a valve member adapted to close said throat, an opening to said passenger compartment in said last-mentioned duct means, a second valve element adapted to close said last-mentioned opening, and operating mechanisms for said valve members whereby the latter may be individually adjusted to control the air flow to said windshield and said passenger compartment.

12. In a vehicle having a passenger compartment, a cowl having an opening therein, a windshield extending upwardly from said cowl, a pair of walls and defining a passage extending downwardly from said opening and terminating exteriorly of the vehicle, a closure, means for operating said closure to cover and uncover said opening, a third wall defining with the inner of said first mentioned walls a second passage communicating with said opening, duct means communicating with said second passage and forming a third passage inward of said second passage for conducting air from said second passage to said windshield for defrosting the latter, said third passage having a restricted throat, a valve member adapted to close said throat, an opening to said passenger compartment in said last-mentioned duct means, a second valve element adapted to close said last-mentioned opening, operating mechanisms for said valve members whereby the latter may be individually adjusted to control the air flow to said windshield and said passenger compartment, means disposed to heat the air entering said third passage, and means for inducing air flow through to said third passage.

13. In a motor vehicle having an engine compartment and a passenger compartment, a cowl having openings therein, spaced, substantially transversely extending wall means disposed beneath one of said openings in said cowl and forming a through air passage between said compartments for insulating said passenger compartment from said engine compartment, partition means forming with the inner of said wall means a second passage adjacent said first-mentioned passage through which air from an opening in said cowl may flow to said passenger compartment, and closure means for controlling the flow of air to said passages.

References Cited in the file of this patent

UNITED STATES PATENTS

| | | |
|---|---|---|
| 1,446,725 | Shamberg | Feb. 27, 1923 |
| 2,045,044 | Modine | June 23, 1936 |
| 2,185,486 | Wahlberg | Jan. 2, 1940 |
| 2,235,642 | Lintern et al. | Mar. 18, 1941 |
| 2,257,638 | Moore | Sept. 30, 1941 |
| 2,298,163 | Raney | Oct. 6, 1942 |
| 2,301,512 | Breese | Nov. 10, 1942 |
| 2,304,642 | Hans | Dec. 8, 1942 |
| 2,306,796 | Staley et al. | Dec. 29, 1942 |
| 2,309,202 | Moore | Jan. 26, 1943 |
| 2,488,278 | Findley | Nov. 15, 1949 |
| 2,510,790 | Arnold | June 6, 1950 |